(12) United States Patent
Creixell

(10) Patent No.: US 8,561,746 B2
(45) Date of Patent: Oct. 22, 2013

(54) MOTORCYCLE

(76) Inventor: Jose Luis Belil Creixell, Barcelona (ES)

( * ) Notice: Subject to any disclaimer, the term of this patent is extended or adjusted under 35 U.S.C. 154(b) by 10 days.

(21) Appl. No.: 13/134,549

(22) Filed: Jun. 8, 2011

(65) Prior Publication Data

US 2011/0303477 A1    Dec. 15, 2011

(30) Foreign Application Priority Data

Jun. 9, 2010    (ES) .................................. 201030594

(51) Int. Cl.
*B60K 13/04* (2006.01)
*B60K 17/354* (2006.01)
*B60K 17/28* (2006.01)

(52) U.S. Cl.
USPC ........... 180/296; 180/227; 180/244; 180/383; 180/374

(58) Field of Classification Search
USPC ................ 180/224, 374, 376, 383; 280/284; 190/296
See application file for complete search history.

(56) References Cited

U.S. PATENT DOCUMENTS

| | | | | |
|---|---|---|---|---|
| 3,220,154 A | * | 11/1965 | Van Der Schoot | 53/475 |
| 4,576,024 A | * | 3/1986 | Weber | 70/252 |
| 4,800,979 A | * | 1/1989 | Tatsuji | 180/227 |
| 4,951,791 A | | 8/1990 | Belil Creixell | |
| 5,125,497 A | * | 6/1992 | Sundermann | 198/463.3 |
| 5,240,087 A | * | 8/1993 | Parker | 180/231 |
| 5,531,289 A | * | 7/1996 | Muramatsu | 180/227 |
| 5,857,538 A | * | 1/1999 | Chambers | 180/219 |
| 5,908,078 A | * | 6/1999 | Belil Creixell | 180/219 |
| 6,691,814 B2 | * | 2/2004 | Toyoda | 180/227 |
| 6,883,630 B2 | * | 4/2005 | Morin | 180/244 |
| 7,559,566 B2 | * | 7/2009 | Fujita | 280/284 |
| 8,177,015 B2 | * | 5/2012 | Kakuta | 180/296 |
| 2004/0035629 A1 | * | 2/2004 | Morin et al. | 180/244 |
| 2005/0233846 A1 | * | 10/2005 | Green et al. | 474/47 |

FOREIGN PATENT DOCUMENTS

| | | |
|---|---|---|
| ES | 2054571 A2 | 8/1994 |
| ES | 1031409 U | 1/1996 |
| ES | 1032944 U | 7/1996 |
| ES | 2070670 B1 | 8/1997 |
| ES | 2070671 B1 | 8/1997 |
| ES | 2066658 B1 | 11/1997 |
| SE | 2107930 B1 | 7/1998 |

* cited by examiner

*Primary Examiner* — Paul N Dickson
*Assistant Examiner* — Daniel Yeagley
(74) *Attorney, Agent, or Firm* — Lawrence G. Fridman

(57) ABSTRACT

The motorcycle comprises an engine with a gearbox, a gear group and a drive wheel. A secondary transmission chain placed between the engine and said gear group, whereas a tertiary transmission chain is placed between the gear group and the drive wheel. The secondary transmission chain is placed at one side of the motorcycle and the tertiary transmission chain is placed at an opposite side of the motorcycle with respect to the longitudinal axis thereof. This arrangement is resulted in the motorcycle body having substantially narrower width compared to the width of the prior art motorcycles.

16 Claims, 3 Drawing Sheets

MOTORCYCLE

FIELD OF THE INVENTION

The present invention relates in general to motorcycles, and more particularly it relates to motorcycles used on irregular grounds.

BACKGROUND OF THE INVENTION

The motorcycles currently known in the prior art typically comprise a transmission mechanism which deliver a motion from the crankshaft to the drive wheel in two phases. A primary transmission extends from the crankshaft to the gearbox or gear group, whereas a secondary transmission is provided to extend the motion from the gearbox or gear group to the drive wheel.

The primary transmission is typically provided in the form of chain or gears. On the other hand, the secondary transmission can be provided as a conventional link chain or any other suitable transmission, such as for example, shaft, belt, etc.

One example of the prior art motorcycle is disclosed by the inventor's own Spanish patent P9200916. In this motorcycle, the primary transmission is placed between the engine crankshaft and the gearbox. The transmission elements of the secondary transmission and the tertiary transmission are placed at the same side of the motorcycle, with respect to its longitudinal axis.

This design is resulted in a substantial width of the motorcycle, which causes an ergonomic problem and requires an additional space for driving and parking.

From the ergonomic point of view, it is essential to place the components of the motorcycle in a position, so as not to disturb the motorcycle rider, especially when he/she rides standing up or in an upright position.

SUMMARY OF THE INVENTION

The motorcycle of the present invention comprises an engine with a gearbox, a gear group, and a drive wheel. A secondary transmission chain is situated between the engine and the gear group. A tertiary transmission chain is positioned between the gear group and the drive wheel. The secondary transmission chain is placed at one side of a motorcycle with respect to the longitudinal axis of the motorcycle and the tertiary transmission chain is placed at the other side of the motorcycle with respect to the longitudinal axis thereof.

Furthermore, in the motorcycle of the invention, the gear group comprises a detachable hub. Two brake discs and two gear rims are positioned within the hub. According to a preferred embodiment, the hub is formed by at least three detachable elements. Such elements are being mounted to and removed from frontal tips of a swing arm curved inwardly toward an inner part of a motorcycle frame and from ears of the motorcycle frame.

The motorcycle of the invention further comprises a shock absorber associated with a drive wheel. To obtain an extended length, an upper part of the shock absorber is inclined rearwardly with respect to the motorcycle vertical.

Furthermore, the motorcycle of the invention also comprises a swing arm having a bridge. At least one hole is formed in the bridge allowing passage of a gas collector. The engine is connected to an exhaust silencer by the gas collector. A region of the gas collector having an elevated temperature is placed below the gear group.

The motorcycle of the invention further comprises at least one cam provided for tightening of the secondary transmission. The cam is connected to an engine axis through eccenters.

The above-discussed features of the motorcycle, according to the present invention, are resulted in the following advantages.

The design of the hub containing the three elements provides the body of the motorcycle, which is narrower than the motorcycle bodies of the prior art.

An enhanced braking action is achieved with a reduced diameter of the brake discs, a low weight and reduced angular inertia. Furthermore, a heat evacuation surface of the brake is also increased, with not-suspended mass in the wheel being removed.

In the invention the diameter of the gear rim of the drive wheel is substantially reduced. The tightness of the secondary and tertiary transmission chains is always constant.

The design of the motorcycle of the invention substantially increases the length of the shock absorbers. For example, the length up to 500 mm can be achieved.

BRIEF DESCRIPTION OF THE DRAWINGS

Exemplary embodiments of the invention will be now described in greater detail herein below with reference to the accompanying drawings, in which.

DETAILED DESCRIPTION OF THE INVENTION

Figure 1:
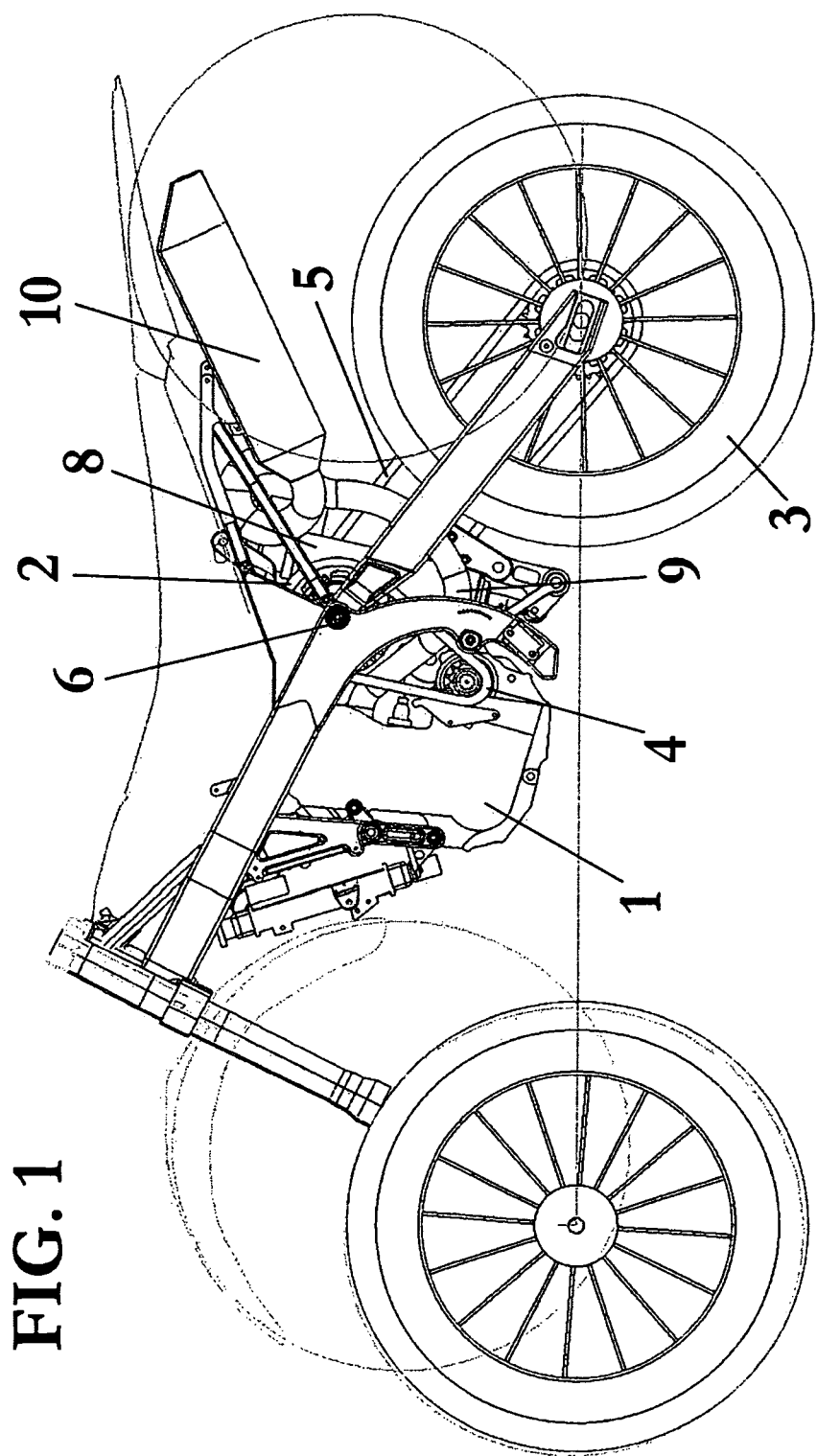
FIG. 1 is a diagrammatical side elevational view of the motorcycle according to the present invention.

As shown in FIG. 1, the motorcycle of the present invention comprises an engine 1, a gear and brake group 2, a drive wheel 3, a secondary transmission chain 4 placed between the engine 1 and the gear group 2. A tertiary transmission chain 5 is placed between the gear group 2 and the drive wheel 3.

A primary transmission of the motorcycle is typically placed between the crankshaft of the engine and the gearbox. The primary transmission has not been shown in the drawings because of the conventional nature thereof.

It should be noted that in the present application, the term "transmission chain" has a meaning of any suitable transmission arrangement for motorcycles and does not intend to limit the scope of the present invention to the "chains" only.

In the motorcycle according to the invention, the secondary transmission chain 4 is placed at one side of the motorcycle, with respect to the longitudinal axis thereof. On the other hand, a tertiary transmission chain 5 is placed at an opposite side of the motorcycle, with respect to the longitudinal axis. This arrangement is resulted in the motorcycle body having substantially narrower width compared to the width of the prior art motorcycles.

The motorcycle according to the invention is provided with a hub assembly having a shaft 6. One or two brake discs 7 are provided at opposite ends of the shaft. Gear rims 2a are formed with a plurality of detachable elements. In the preferred embodiment, there are provided three detachable elements 6a, 6b. These elements are being attached to and detached from upper/frontal tips 14a of the swing arm 14, inwardly curving toward the motorcycle frame. In this manner, ears of the motorcycle frame are formed. Thus, the ears of the frame occupy a minimal space and the entire thickness.

The motorcycle of the invention also comprises a shock absorber 8 associated with the drive wheel 3. As shown in FIG. 1, an upper part of the shock absorber 8 is inclined rearwardly with respect to the motorcycle vertical and a lower part of the shock absorber.

The shock absorber is to provide with a rod having a substantial length. For example, the rod can have a length greater than 500 mm. This is illustrated in FIG. 1, wherein a rear or drive wheel is shown in its end positions. This arrangement enables to obtain a sweep of 370 mm, which is greater than the sweep conventional motorcycles. In this manner, the shock absorbers are provided having a greater range, while maintaining the same seat and fender height, so that the ergonomic requirements are not adversely affected.

Figure 2:
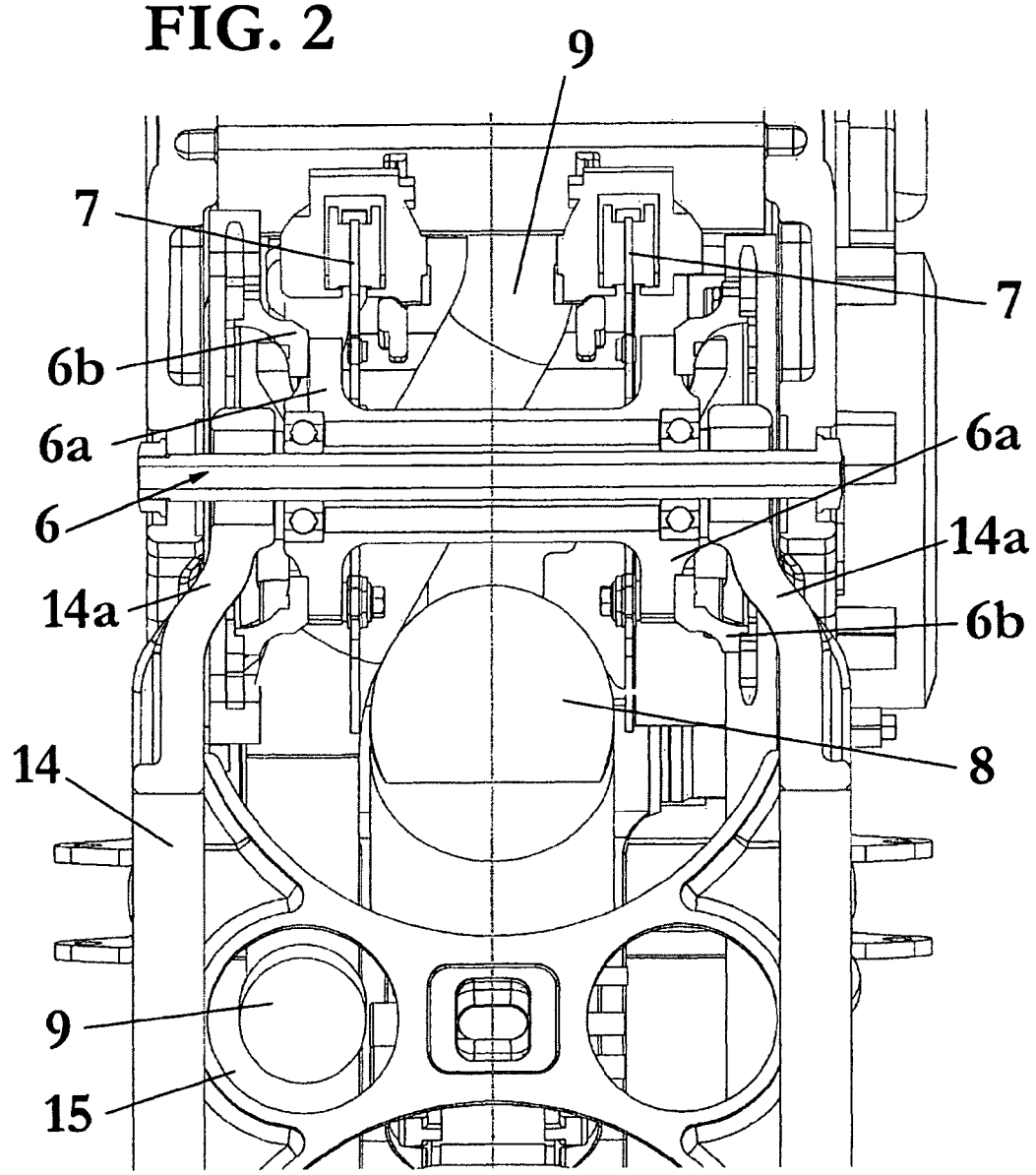
FIG. 2 is a diagrammatical plan view of a section of a central part of the motorcycle according to the present invention.
Figure 4:
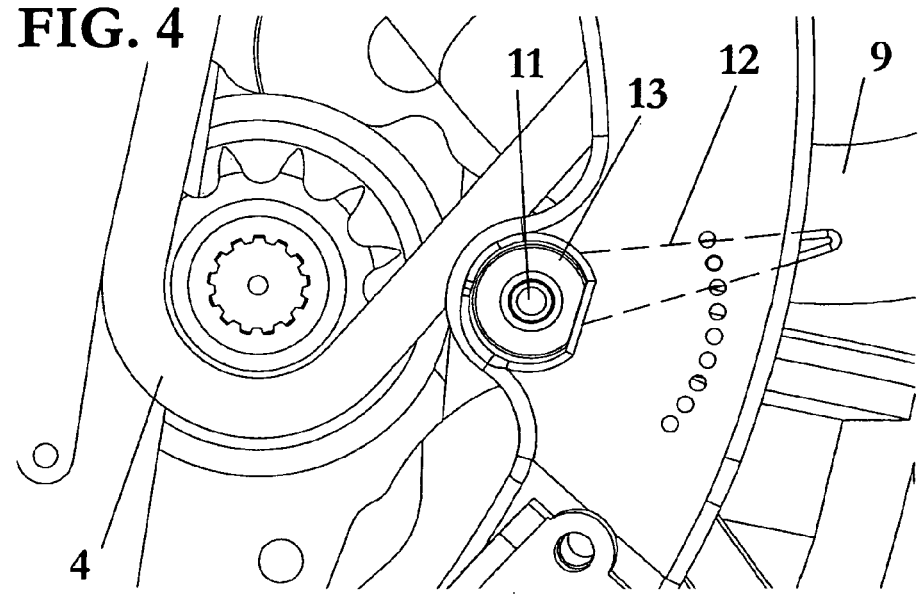
FIG. 4 is a side elevation view of the tightening cam assembly of the secondary transmission of the motorcycle of the present invention.

As illustrated in FIGS. 1, 2 and 4, the motorcycle of the invention is also provided with a gas collector 9 which connects the engine 1 with an exhaust silencer 10. At least a portion of the gas collector 9 is placed below the gear group 2. In this arrangement, regions of the gas collector 9 having elevated temperature, are substantially spaced from the motorcycle seat. This arrangement prevents the rider from touching such elevated temperature regions of the gas collector 9, while the motorcycle is in use.

Figure 3:
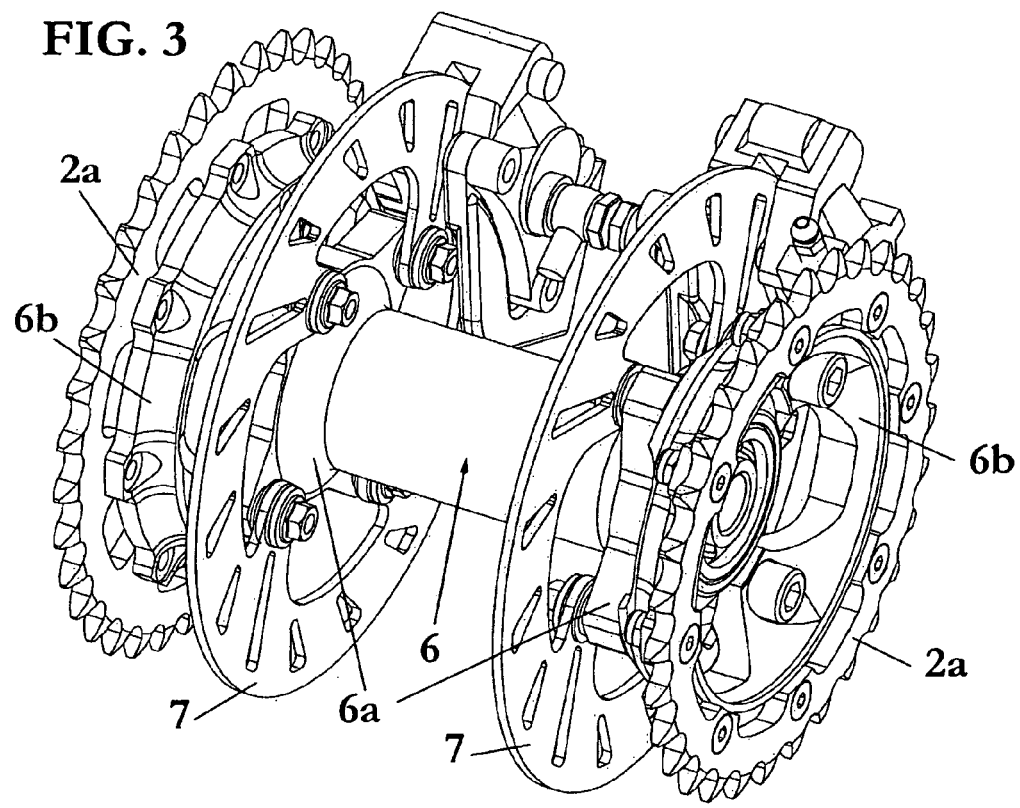
FIG. 3 is a diagrammatical perspective view of the hub of the gear group of the motorcycle of the present invention.

As best illustrated in FIG. 2, the motorcycle of the invention comprises a swing arm 14 with at least one hole 15 provided within the bridge. The gas collector 9 passes through the hole 15, while connecting the engine 1 with the exhaust silencer 10 of the motorcycle. At least the elevated temperature region of the gas collector 9 is placed below the gear group 2. FIG. 3 illustrates the gear group 2 of the motorcycle consisting of gear rims 2a positioned at opposite sides of the shaft 6. The brake discs 7 are also provided at each end of the shaft 6 and disposed inwardly relative to the gear rims 2a. A hub assembly consists of the shaft 6 with two sub-assemblies provided at each end thereof. In the preferred embodiment each sub-assembly consists of three elements 6a and 6b.

In FIG. 4 illustrates a tightening arrangement for the secondary transmission 4. As illustrated, the secondary transmission 4 is connected with a rear support of the engine 11 through an eccenter 13. At least one cam 12 is provided for tightening of the secondary transmission 4. The cam 12 is connected to an axis 11 of the engine through the eccenters 13.

For the simplicity reasons, the rest of the components of the motorcycle of the present invention have not been described, because such components are conventional in nature and do not form a part of the present invention.

Although specific embodiments of the motorcycle of the invention have been described in the application, it should be clear for a person skilled in the art that numerous variations and modifications of the invention are contemplated without departure from the scope and spirit of the invention.

What is claimed is:

1. A motorcycle, comprising:
a motorcycle frame;
a swing arm associated with the motorcycle frame;
an engine having a gearbox;
a gear group;
a drive wheel;
a secondary transmission comprising a chain disposed between said engine and said gear group;
a tertiary transmission comprising a chain disposed between said gear group and said drive wheel;
said chain of the secondary transmission is positioned at one side and said chain of the tertiary transmission is positioned at an opposite side of the motorcycle with respect to a longitudinal axis thereof;
said gear group includes a detachable hub assembly comprising a shaft, two brake discs and two gear rims associated therewith;
said two brake discs and said two gear rims are coaxially mounted on the shaft; and
said swing arm pivots about the shaft of the detachable hub assembly.

2. A motorcycle according to claim 1, wherein the swing arm has frontal tips, said hub assembly is formed by a plurality of detachable elements, said detachable elements are being attached to and detached from the frontal tips of the swing arm inwardly curving toward the motorcycle frame, so as to form ears of the motorcycle frame.

3. A motorcycle according to claim 2, wherein said plurality of detachable elements consists of at least three detachable elements.

4. A motorcycle according to claim 1, further comprising a shock absorber associated with said drive wheel, an upper part of said shock absorber is rearwardly inclined with respect to a motorcycle vertical.

5. A motorcycle according to claim 1, wherein the swing arm comprises at least one hole, at least one gas collector passes through said at least one hole, said gas collector connecting the engine with an exhaust silencer of the motorcycle, at least a portion of said gas collector is placed below said gear group.

6. A motorcycle according to claim 1, further comprising at least one cam provided for tightening of the secondary transmission, said cam is connected to an engine axis through eccenters.

7. A motorcycle according to claim 6, wherein said at least one cam comprises a plurality of cams adapted for tightening the secondary transmission.

8. A motorcycle according to claim 1, wherein the coaxial mounting of the brake disc and the gear rim on the shaft and said pivoting of the swing arm about the shaft of the detachable hub assembly causes constant tightness of the secondary and tertiary transmission chains.

9. A motorcycle, comprising:
a motorcycle frame;
a swing arm associated with the motorcycle frame;
an engine having a gearbox;
a gear group;
a drive wheel;
a secondary transmission comprising a chain disposed between said engine and said gear group;
a tertiary transmission comprising a chain disposed between
said gear group and said drive wheel;
said chain of the secondary transmission is positioned at one side and said chain of the tertiary transmission is positioned at an opposite side of the motorcycle with respect to a longitudinal axis thereof;
said gear group includes a detachable hub assembly comprising a shaft, at least one brake disc and at least one gear rim;
said at least one brake disc and said at least one gear rim are coaxially mounted on the shaft;
said swing arm pivots about the shaft of the detachable hub assembly; and
the swing arm further comprises at least one hole, at least one gas collector passes through said at least one hole, said gas collector connecting the engine with an exhaust silencer of the motorcycle, at least a portion of said gas collector is placed below said gear group.

10. A motorcycle according to claim 9, wherein the swing arm has frontal tips, said hub assembly is formed by a plurality of detachable elements, said detachable elements are being attached to and detached from the frontal tips of the swing arm inwardly curving toward the motorcycle frame, so as to form ears of the motorcycle frame.

11. A motorcycle according to claim 10, wherein said plurality of detachable elements consists of at least three detachable elements.

12. A motorcycle according to claim 9, further comprising a shock absorber associated with said drive wheel, an upper part of said shock absorber is rearwardly inclined with respect to a motorcycle vertical.

13. A motorcycle according to claim 9, further comprising at least one cam provided for tightening of the secondary transmission, said cam is connected to an engine axis through eccenters.

14. A motorcycle according to claim 13, wherein said at least one cam comprises a plurality of cams adapted for tightening the secondary transmission.

15. A motorcycle according to claim 9, wherein said detachable hub assembly consists of two said brake discs and two gear rims associated therewith.

16. A motorcycle according to claim 9, wherein the coaxial mounting of the brake disc and the gear rim on the shaft and said pivoting of the swing arm about the shaft of the detachable hub assembly causes constant tightness of the secondary and tertiary transmission chains.

\* \* \* \* \*